(12) United States Patent
Tarade et al.

(10) Patent No.: US 10,369,904 B2
(45) Date of Patent: Aug. 6, 2019

(54) RECLINING REAR SEAT ASSEMBLY

(71) Applicant: Lear Corporation, Southfield, MI (US)

(72) Inventors: Kishore Tarade, Ergolding (DE); Rafal Pater, Oberding-Schwaig (DE)

(73) Assignee: LEAR CORPORATION, Southfield, MI (US)

( * ) Notice: Subject to any disclaimer, the term of this patent is extended or adjusted under 35 U.S.C. 154(b) by 98 days.

(21) Appl. No.: 15/670,388

(22) Filed: Aug. 7, 2017

(65) Prior Publication Data

US 2018/0147958 A1  May 31, 2018

(30) Foreign Application Priority Data

Nov. 25, 2016 (DE) .................... 10 2016 223 421

(51) Int. Cl.
| | |
|---|---|
| *B60R 21/206* | (2011.01) |
| *B60N 2/36* | (2006.01) |
| *B60N 2/20* | (2006.01) |
| *B60R 21/02* | (2006.01) |
| *B60N 2/90* | (2018.01) |

(Continued)

(52) U.S. Cl.
CPC ............. *B60N 2/20* (2013.01); *B60N 2/2213* (2013.01); *B60N 2/36* (2013.01); *B60N 2/68* (2013.01); *B60N 2/919* (2018.02); *B60R 21/026* (2013.01)

(58) Field of Classification Search
CPC . B60N 2/206; B60N 2/20; B60N 2/36; B60N 2/3013; B60R 21/026; B60R 2011/0012
See application file for complete search history.

(56) References Cited

U.S. PATENT DOCUMENTS 6,336,670 B1 * 1/2002 Saavas ................ B60N 2/3013
                                                296/24.43
6,398,291 B1   6/2002 Reusswig et al.
(Continued)

FOREIGN PATENT DOCUMENTS

DE       19502333 A1   8/1996
DE    102012210924 A1   1/2013
(Continued)

OTHER PUBLICATIONS

Combined Search and Examination Report under Sections 17 and 18(3) in corresponding International Patent Application No. GB1707457.6, dated Nov. 6, 2017, 8 pages.

*Primary Examiner* — Timothy J Brindley
(74) *Attorney, Agent, or Firm* — Brooks Kushman P.C.

(57) ABSTRACT

A vehicle seat assembly for a vehicle includes a bulkhead mountable to a vehicle body structure at a first location. The seat assembly also includes a seat bottom having a seat pan mountable to the vehicle body structure at a second location that is different than the first location. A seat back of the seat assembly includes a frame. A lower end of the frame is pivotably attached to the bulkhead at a pivot point so that the seat back is pivotable relative to the bulkhead and is supported above the seat bottom by the bulkhead when the vehicle seat assembly is mounted to the vehicle body. A recline mechanism has a driving arrangement mounted to one of the bulkhead and the frame and a driven arrangement mounted to the other of the bulkhead and the frame. The recline mechanism is operable to pivot the seat back relative to the bulkhead.

20 Claims, 5 Drawing Sheets

(51) Int. Cl.
  *B60N 2/22* (2006.01)
  *B60N 2/68* (2006.01)

(56) References Cited

U.S. PATENT DOCUMENTS

| | | | |
|---|---|---|---|
| 8,353,550 B1 | 1/2013 | Lucas | |
| 2002/0089223 A1* | 7/2002 | Yu | B60N 2/0232 297/362.11 |
| 2006/0170236 A1* | 8/2006 | Porter, II | B60R 5/04 296/37.16 |
| 2007/0216185 A1* | 9/2007 | McMillen | B60N 2/206 296/64 |
| 2014/0265501 A1* | 9/2014 | Line | B60N 2/0232 297/341 |
| 2016/0083020 A1* | 3/2016 | Chen | B60N 2/22 296/24.43 |
| 2016/0297330 A1* | 10/2016 | Linnenbrink | B60N 2/2231 |
| 2018/0015843 A1* | 1/2018 | Bruck | B60N 2/2213 |

FOREIGN PATENT DOCUMENTS

| | | | | |
|---|---|---|---|---|
| DE | 102015218354 A1 | | 1/2017 | |
| DE | 102015218357 A1 | * | 1/2017 | B60N 2/36 |
| EP | 1473199 A2 | * | 11/2004 | B60R 21/026 |
| EP | 1623870 A2 | * | 2/2006 | B60N 2/3011 |
| FR | 2663270 A1 | * | 12/1991 | B60N 2/3015 |
| FR | 3010021 B1 | * | 10/2016 | B60R 5/006 |
| FR | 3034731 B1 | * | 10/2018 | B60N 2/36 |
| GB | 2539500 A | | 12/2016 | |
| GB | 2539501 A | | 12/2016 | |
| WO | 2007098614 A1 | | 9/2007 | |
| WO | 2008078308 A1 | | 7/2008 | |
| WO | 2014147414 A1 | | 9/2014 | |
| WO | WO-2016076318 A1 | * | 5/2016 | B60N 2/06 |

\* cited by examiner

RECLINING REAR SEAT ASSEMBLY

CROSS-REFERENCE TO RELATED APPLICATIONS

This application claims foreign priority benefits under 35 U.S.C. § 119(a)-(d) to DE 10 2016 223 421.8, filed Nov. 25, 2016, the disclosure of which is hereby incorporated by reference in its entirety.

TECHNICAL FIELD

This disclosure relates to reclining rear seats.

BACKGROUND

Vehicles include one or more seats for supporting occupants. Many vehicles have a rear-seat area including one or more seat assemblies. The seat assemblies may include a seat back and a seat bottom that are pivotal with respect to each other.

SUMMARY

According to one embodiment, a rear seat assembly for a vehicle includes a bulkhead pivotably mountable to a vehicle body structure. The rear seat assembly further includes a seat back having a frame with a front side and a backside. The frame is pivotably attached to the bulkhead with the backside facing the bulkhead and the frame supports a cushion. A recline mechanism is arranged to pivot the seat back relative to the bulkhead.

According to another embodiment, a vehicle seat assembly for a vehicle includes a bulkhead mountable to a vehicle body structure at a first location. The bulkhead has a pair of spaced brackets. The seat assembly also includes a seat bottom having a seat pan mountable to the vehicle body structure at a second location that is different than the first location. The seat bottom supports a bottom cushion disposed on the seat pan. A seat back of the seat assembly includes a frame having a pair of spaced apart side members and at least one cross member extending between the side members. A lower end of each of the side members is pivotably attached to a corresponding one of the brackets at a pivot point so that the seat back is pivotable relative to the bulkhead about the pivot point and is supported above the seat bottom by the bulkhead when the vehicle seat assembly is mounted to the vehicle body. The frame further includes a backside facing the bulkhead and a front side having a back cushion adjacent thereto. A recline mechanism has a driving arrangement mounted to one of the bulkhead and the frame and a driven arrangement mounted to the other of the bulkhead and the frame. The recline mechanism is operable to pivot the seat back relative to the bulkhead.

A method of assembling a vehicle seat including a bulkhead, a back frame, and a recline mechanism having a drive member and a driven member is disclosed herein. The method includes attaching the drive member to one of the bulkhead and the back frame, and attaching the driven member to the other of the bulkhead and the back frame. The method further includes pivotably attaching the back frame to the bulkhead with a backside of the back frame facing the bulkhead, and with the drive member and the driven member disconnected, installing trim on the back frame while the back frame is in a trim-installation position. The method also includes pivoting the back frame towards the bulkhead and subsequently connecting the driven member to the drive member.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
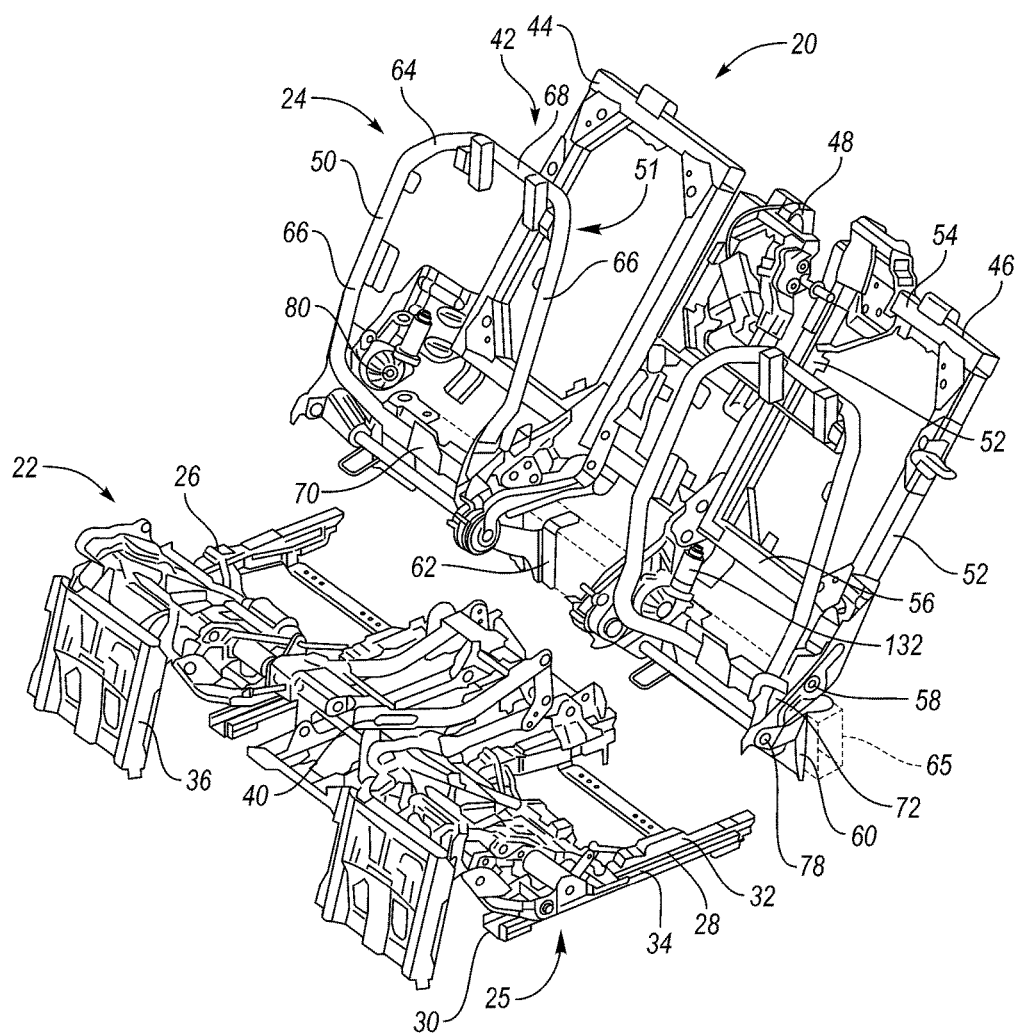
FIG. 1 is a perspective view of a rear seat assembly.
Figure 2:
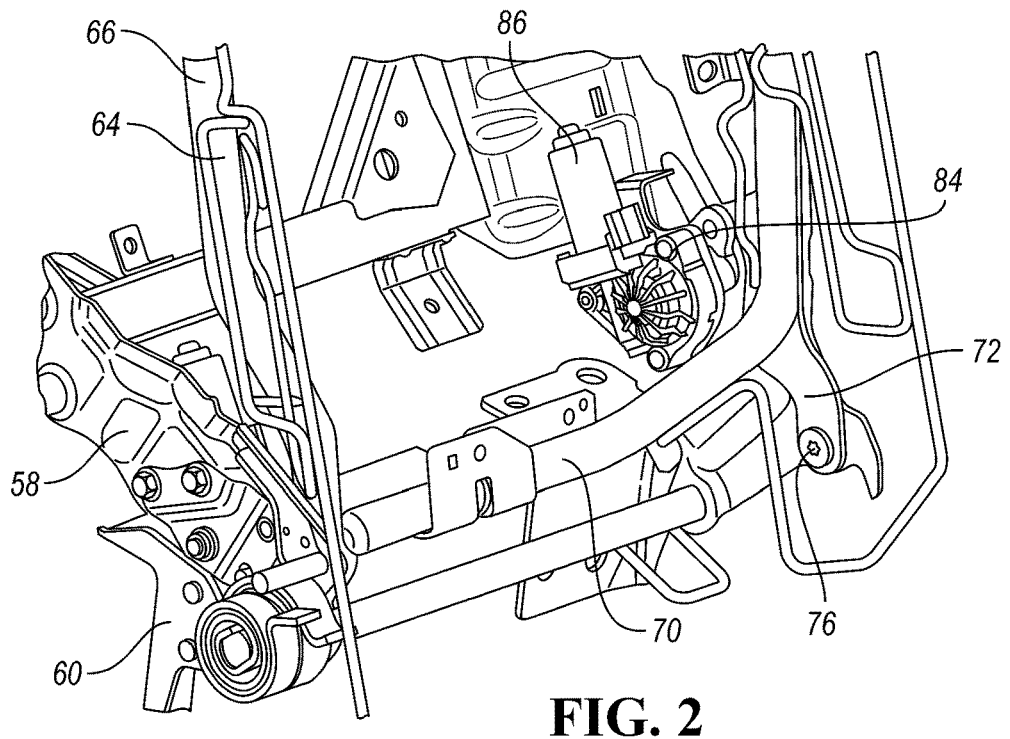
FIG. 2 is a fragmentary perspective view of an upper assembly of the rear seat assembly shown in FIG. 1.
Figure 3:
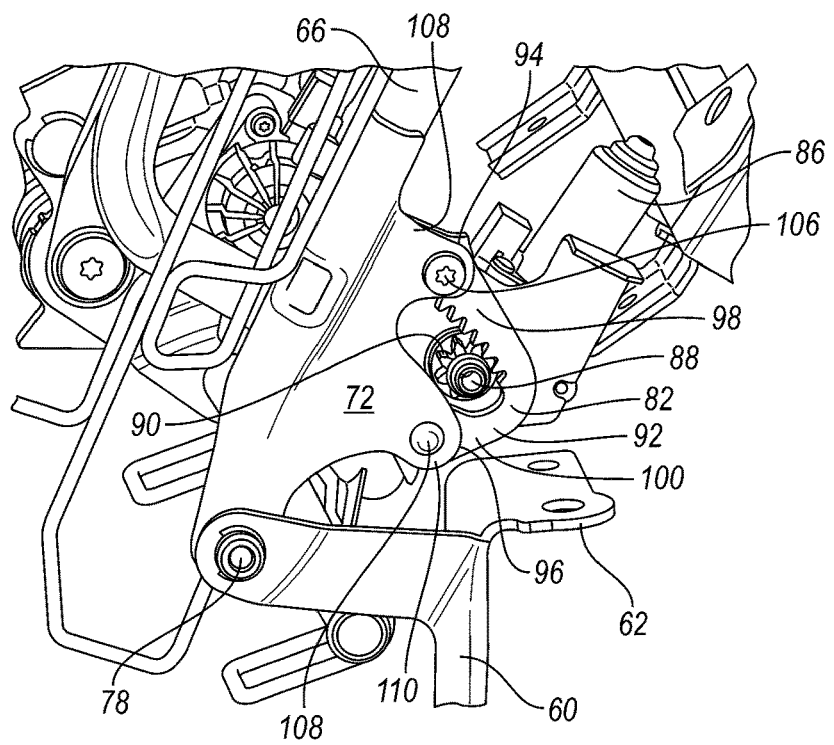
FIG. 3 is a fragmentary perspective view of an outer side of the upper assembly with select components omitted for illustrative purposes.

FIG. 1 shows a rear seat assembly 20 for use with a vehicle, such as an sport-utility vehicle (SUV) or crossover vehicle. The rear seat assembly 20 may include two passenger seats as shown or may include three or more passenger seats in other embodiments. Referring to FIGS. 1 through 3, the rear seat assembly 20 has a lower subassembly 22 and an upper subassembly 24. The lower subassembly 22 includes a pair of left and right seat bottoms 25. Each of the seat bottoms 25 may have a seat pan 26 supported above the vehicle floor by a pair of rails 28 each having a lower member 30 mounted to the vehicle floor (or other vehicle body structure) and an upper member 32 telescopically slidable relative to the lower member 30 to move the seat bottom 25 fore and aft. A slide mechanism 34 allows the upper and lower members to slide relative to each other. The slide mechanism 34 may include a latch mechanism that locks the upper and lower members relative to each other. The seat bottom 25 may include a folding leg support 36 moveable between a deployed position and a stowed position via a folding mechanism 40. A cushion, e.g., a seat foam pad coved by a trim cover, (not shown) is disposed on the seat pan 26 to provide a seating surface for the occupants.

The upper subassembly 24 includes a bulkhead assembly 42 having a rear passenger-side bulkhead 44, a rear driver-side bulkhead 46, and a middle bulkhead 48. The bulkhead assembly 42 provides structure for seatbacks 50 and creates a barrier between a cargo area, which may be located behind the rear seat assembly 20, and a passenger area of the vehicle. In many SUV and crossover vehicles, the seatback is the sole barrier between the passenger compartment and the cargo area. When cargo objects within the cargo area are propelled forward they collide with the seatback. Since the seatback is in direct contact with an occupant, the impact forces of the cargo objects are transferred through the seatback and to the occupant. The bulkhead of the present disclosure provides an additional barrier between the occupants and the cargo area. The bulkhead is not in contact with the occupant and the impact forces on the bulkhead are not transferred into the occupant as they would be with designs only having a seatback.

Each of the driver-side and passenger-side bulkheads 44, 46 may have a pair of spaced apart side members 52 interconnected by an upper cross member 54 and a lower cross member 56 to form a generally rectangular frame. The bulkhead assembly 42 may be mounted to a vehicle body structure such as traverse member 65 by mounting brackets 60. Each of the mounting brackets may include a flange 62 that is fastened to the vehicle body structure 65. In other embodiments, the bulkhead assembly 42 may be mounted to the vehicle floor. A plurality of side brackets 58 each connects between a corresponding mounting bracket 60 and a corresponding side member 52.

The seatbacks 50 are connected to the passenger-side bulkhead 44 and the driver-side bulkhead 46 so that a backside 51 of each seat back faces a respective bulkhead. Each seatback 50 supports the torso of the occupant and includes a frame 64 and a cushion (not shown) supported on a front side of the frame. Each frame 64 may have spaced apart side members 66 interconnected by an upper cross member 68 and a lower cross member 70. Lower brackets 72 each connect to one of the side members 66 at a first end and to one of the side brackets 58 at a second end. The first end of the bracket 72 may be welded to the side members 66. The second end of each bracket 72 is pivotally attached to a respective side bracket 58. The side bracket 58, the mounting bracket 60, and the lower bracket 72 may each define holes that are concentric with each other. A pivot member 76 such as a pin or fastener extends through the concentric holes to create a pivot point 78 for the seatback 50. The seatbacks 50 may each be pivotally attached to a corresponding bulkhead by a pair of pivot points that allow the seatback to pivot relative to a respective bulkhead through a range of positions. The pair of pivot points define a pivot axis that extends through a center of the pivot points 78.

Each seat of the rear seat assembly 20 may include a recline mechanism 80 for adjusting the position of the associated seatback 50 relative to the associated bulkhead 44, 46. The recline mechanisms 80 may be automatic (as shown) or may be manual. Each recline mechanism 80 may include a drive arrangement 84 connected to one of the bulkhead and the seatback and a driven arrangement 82 connected to the other of the bulkhead and the seatback. In the illustrated embodiment, the drive arrangement 84 is connected to the bulkhead 44, 46 and the driven arrangement 82 is connected to the seatback 50. For each rear seat, the drive arrangement 84 may be mounted to the side bracket 58 and the driven arrangements 82 may be mounted to the bracket 72. Each of the drive arrangements 84 is driveably engaged with a corresponding one of the driven arrangements 82 to actuate the seatback 50 relative to the bulkhead 44, 46.

The drive arrangements 84 may each include an actuator 86, such as an electric motor, that drives a spindle 88. A drive member such as a pinion 90 or other type of gearing may be fixed to the spindle 88. A gear box may be used to transmit power from the actuator 86 to the spindle 88. The driven arrangement 82 may include a gear, such as a sector gear 92, or other driven member that drivably engages with the pinion 90. The sector gear 92 may include a first end 94 connected to an upper attachment 108 of the bracket 72 and a second end 96 connected to a lower attachment 110 of the bracket 72. The sector gear 92 may include a first segment 98 that defines teeth and a second segment 100 that does not include teeth. The teeth of the sector gear 92 mesh with teeth of the pinion 90.

The sector gear 92 may only be attached at two points, e.g., first end 94 and second end 96, so that removing one of the attachments allows the sector gear to pivot about the other attachment point. In the illustrated embodiment, a removable fastener 106 attaches the first end 94 to the upper attachment area 108 and a non-removable fastener 104 attaches the second end 96 to the lower attachment area 110. The removable fastener 106 may be a bolt, a screw, a pin, or similar component, and the non-removable fastener may be a rivet. In other embodiments, a removable fastener may be used to attach both the first end 94 and the second end 96. When the removable fastener 106 is removed from the assembly, the rivet 104 forms a pivot point for the sector gear 92. The pivotability of the sector gear aids in the assembly process as will be explained in more detail below.

Figure 4:
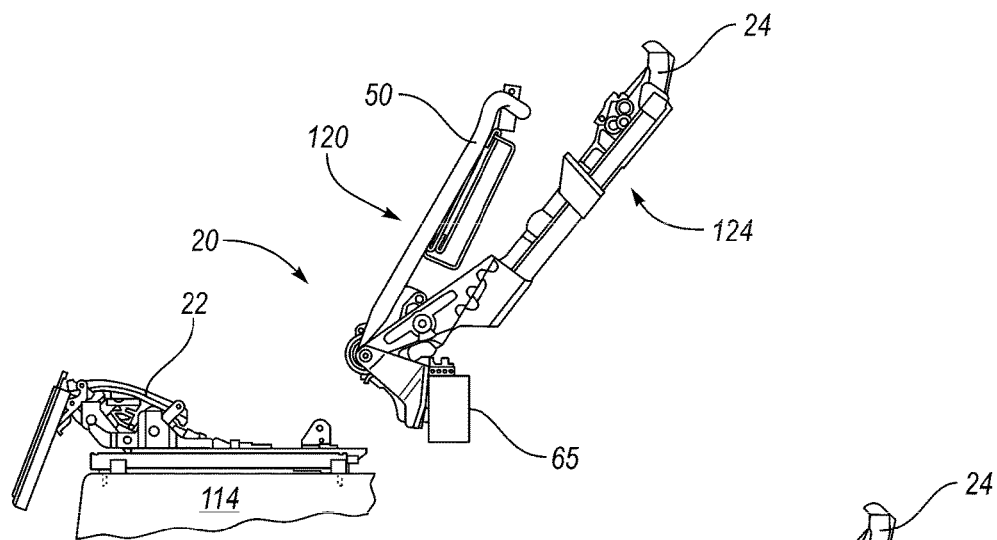
FIG. 4 is a side view of the rear seat assembly in a generally upright position.
Figure 5:
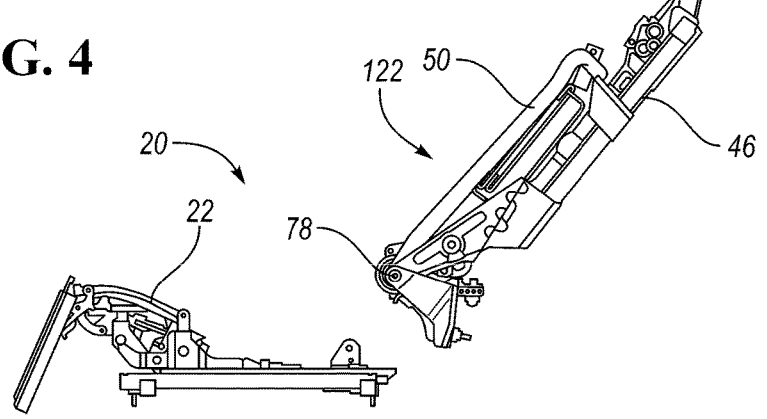
FIG. 5 is a side view of the rear seat assembly in a fully reclined position.

Referring to FIGS. 4 and 5, the lower subassembly 22 and the upper subassembly 24 may not be directly connected to each other. Instead, each of the subassemblies may be supported by the vehicle body structure at a location that correctly positions the lower subassembly 22 relative to the upper subassembly 24. For example, the lower subassembly 22 may be mounted to a portion of the vehicle floor 114 and the upper subassembly 24 may be mounted to a traverse member 65. The upper subassembly 24 may be connected to the vehicle structure so that the pivot points 78 are disposed above a top of the bottom cushion 127. This aids in the fold-forward operation as will be described in more detail below.

Each seatbacks 50 is pivotable relative to a corresponding bulkheads 44, 46 between a first position and a second position, as well as a range of positions therebetween. The first position may be referred to as an upright position 120 (shown in FIG. 4). The term "upright" is not synonymous with vertical. In some embodiments, the seat back may be vertical when in the upright position and in other embodiments the seat back may be at least slightly reclined when in the upright position. As can be seen in FIG. 4, the seatback 50 is slightly relined in the upright position 120. The second position may be referred to as a fully reclined position 122

(FIG. 5). The recline mechanisms 80 pivot the seatbacks 50 between the upright position 120 and the fully reclined position 122 according to inputs from the occupant. In one embodiment, each seatback 50 may have 16 degrees of rotation relative to a respective bulkhead, however, in other embodiments, the degrees of rotation may be increased or decreased. The seat assembly 20 may include user inputs, such as buttons, that enable occupants to adjust the position of the seatback as well as other seat adjustments.

Figure 6:
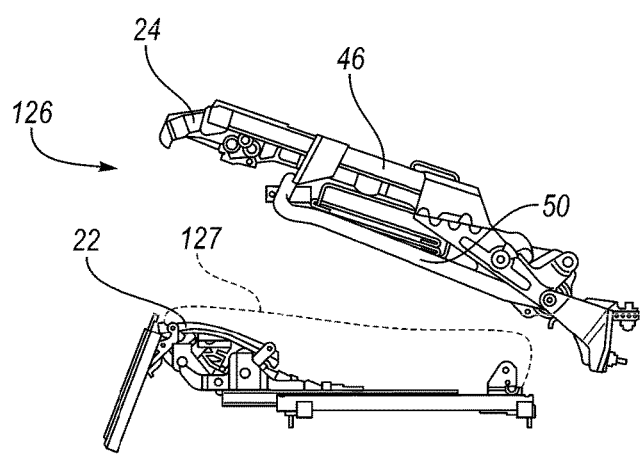
FIG. 6 is a side view of the rear seat assembly in a fold-forward position.

Referring to FIGS. 5 and 6, the bulkhead assembly 42 is pivotally connected to the vehicle body structure between an upright position 124 shown in FIG. 5 and the fold-forward position 126 shown in FIG. 6. The passenger-side bulkhead 44, the driver-side bulkhead 46, and the middle bulkhead 48 may be independently pivotable relative to each other to allow only a portion of the seat assembly 20 to be folded forward. The middle bulkhead 48 may include a latch that secures the middle bulkhead 48 to the driver-side bulkhead 46. The bulkheads 44, 46, and 48, may also pivot about the pivot axis defined by the pivot points 78. When moving to the fold-forward position, the seatback may first be moved to the fully reclined position (unless the seatback is already in the fully reclined position) and then the bulkhead and the seatback may be pivoted to the fold-forward position.

When in fold-forward position, the cushion of the seatback 50 is disposed over the cushion 127 of the seat bottom 25. By placing the pivot axis above the cushion 127 of the seat bottom 25, the bulkhead 46 may be folded more horizontally than if the pivot axis were lower than the top of the seat-bottom cushion 127. In some embodiments, the pivot point 78 may be positioned so that the bulkhead is horizontal when in the fold-forward position.

Figure 7:
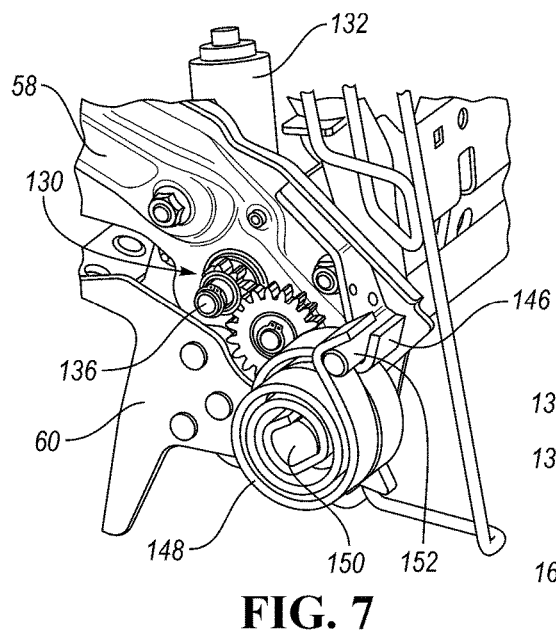
FIG. 7 is a fragmentary perspective view of an inner side of the upper assembly.
Figure 8:
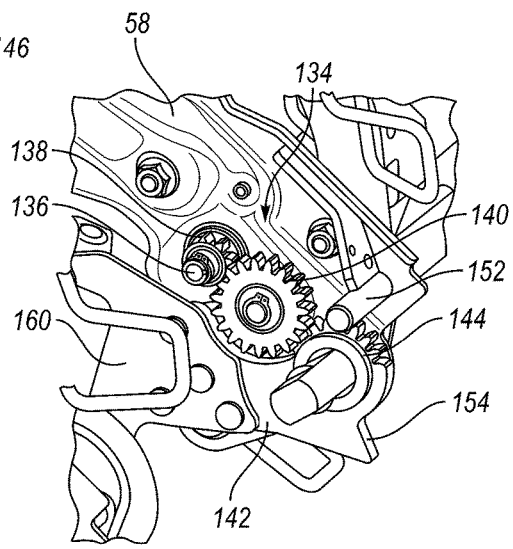
FIG. 8 is a perspective view similar to FIG. 7 with select components omitted to show further details of the upper assembly.

Referring to FIGS. 7 and 8, each of the passenger-side and driver-side bulkheads 44, 46 includes a fold-forward mechanism 130 that pivots a respective bulkhead between an upright position 124 and a fold-forward position 126. Each fold-forward mechanism 130 may include an actuator 132 such as an electric motor and a gearing arrangement 134 that is driven by the actuator. The actuator may be mounted to a corresponding inner side bracket 58 and may include a spindle 136 that supports a pinion gear 138 for rotation about the spindle. The pinion gear 138 may include gear teeth that mesh with the gear teeth of an idler gear 140. The idler gear 140 may be mounted to the side bracket 158 by an axle. A sector gear 144 includes gear teeth that mesh with the gear teeth of the idler gear 140. The sector gear 144 is stationary and provides a reaction surface for pivoting of the bulkhead. The sector gear 144 may be concentric with the pivot axis. The sector gear 144 may be integrally formed on a bracket 142 mounted to one of the mounting brackets 60. Alternatively, the sector gear may be a separate component that is mounted to the bracket.

Each fold-forward mechanism 130 may also include a pair of springs to assist in the folding and unfolding of the bulkhead. An inner spring 146 assists the actuator 132 when folding from the fold-forward position to the upright position, and an outer spring 148 assists the actuator when folding from the upright position to the fold-forward position. The springs 146, 148 may be spiral springs (also known as clock springs) or any other type of suitable spring. Each of the springs may be supported on a spring-support rod 150 that extends from the bracket 142. The support rod 150 may be centered on the pivot axis placing the spiral springs in a concentric arrangement with the sector gear 144. The spring-support rod 150 may include detents, flat sides, keys, or other features to prevent rotation of the springs relative to the support 150. The other ends of the springs 146, 148 engage with a pin 152. The pin 152 is fixed relative to the side bracket 58 with a bracket or other means. The first spring 146 engages with a front side of the pin 152 to push the bulkhead towards the upright position, and the second spring 148 engages with a backside of the pin 152 to pull the bulkhead towards the cabin floor. The pin 152 may also act as a stopper to prevent further rotation of the bulkhead in the fold-forward direction. The pin 152 engages with surface 154 of the bracket 142 to prevent further pivoting of the bulkhead relative to the bracket 142. The stopper prevents the idler gear 140 from decoupling from the sector gear 144.

To fold the bulkhead forward, the actuator 132 rotates the pinion gear 138 in the counterclockwise direction causing the idler gear 140 to walk along the gear teeth of the sector gear 144 (from left to right when viewed from the perspective of FIG. 8) to rotate the bulkhead towards the fold-forward position. The spring 148 biases, e.g., pulls, the bulkhead towards the floor to assist the actuator 132.

To unfold the bulkhead to the upright position, the actuator rotates the pinion gear 138 in the clockwise direction causing the idler gear 140 to walk along the gear teeth of the sector gear (from right to left when viewed from the perspective FIG. 8) to rotate the bulkhead towards the upright position. The spring 146 biases, e.g., pushes, the bulkhead away from the floor to assist the actuator 132.

Figure 9:
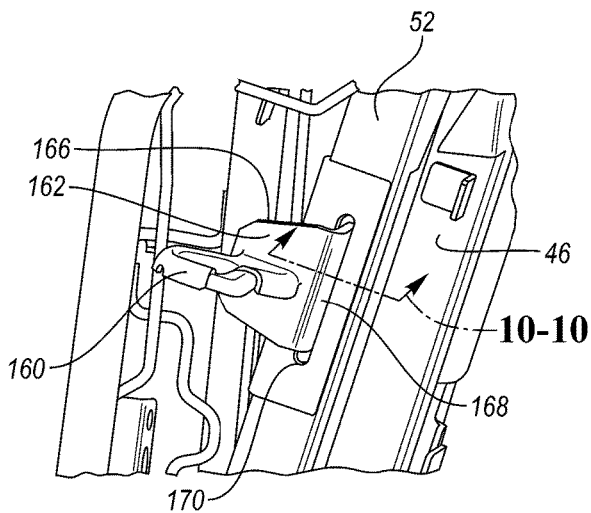
FIG. 9 is a perspective view of a striker assembly installed on a bulkhead of the upper assembly.
Figure 10:
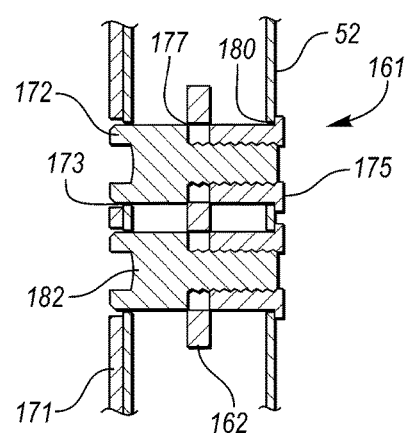
FIG. 10 is a side cross-sectional view of the striker assembly.

Referring to FIGS. 9 and 10, the bulkheads 44, 46 may each be secured in the upright position by a latch system that connects the bulkhead to a vehicle body structure. In this view, the driver-side bulkhead 46 is shown. The latch system may include a striker assembly 161 connected to the bulkhead 46 and a latch connected to the vehicle body structure. The latch engages a striker 160 to lock the bulkhead 46 to the vehicle body structure to maintain the bulkhead 46 in the upright position. The latch system includes an actuator that allows a user to disengage the striker 160 from the latch to permit rotation of the bulkhead to the fold-forward position.

The striker 160 may be connected to the outer side member 52 by a bracket 162. The bracket 162 may include a first segment 166 and a second segment 168. The striker 160 may be attached to the first segment 166 and the second segment 168 may be connected to the side member 52. The side member 52 may define a slot 170 that is elongated in the lengthwise direction of the side member 52. The slot 170 provides clearance for the bracket 162 to be slid within the side member 52. In one or more embodiment, a bracket 171 is provided on the side member 52 proximate the striker assembly to reinforce the side member 52.

Fasteners 172 secure the bracket 162 to the side member 52. The fasteners 172 may be threaded fasteners that engage with nuts 175 or tapped holes. The side member 52 may define holes 173 and holes 180 in respective opposing sides of the side member. The fasteners 172 extend through the holes 173, and the nuts 175 may be welded in the holes 180. The fasteners 172 also extend through openings 177 in the second segment 168 to attach the bracket 162 to the side member 52. The openings 177 may be slots that are elongated in the top-to-bottom direction of the second segment 168. The openings 177 cooperate with the slot 170 allowing the bracket 162 to be adjusted in the lengthwise direction of the side member 52. The fasteners 172 may be bolts having a head 182 with a diameter that approximates the diameter of the holes 173 to hold the fasteners stationary with respect to the side member 52. The heads 182 and the nuts 175 may be enlarged in the axial direction to spatially locate the bracket 162 within the side member 52.

The adjustability of the bracket 162 allows the striker 160 to be adjusted relative to the latch to ensure proper performance. Part tolerance and stack-up issues may require the striker 160 to be adjustable. In other embodiments, the striker 160 may be stationary relative to the side members 52. The illustrated embodiment may provide at least 6 millimeters of striker adjustment in the longitudinal direction of the side member 52.

Figure 11:
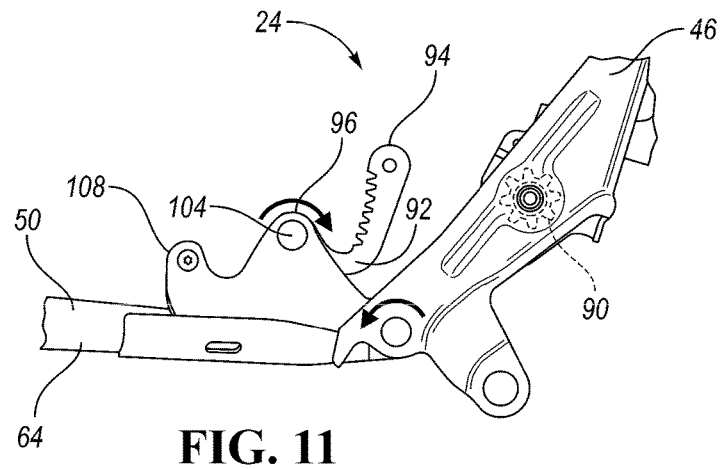
FIG. 11 is a diagrammatical view of a step of an assembly process for the rear seat assembly.
Figure 12:
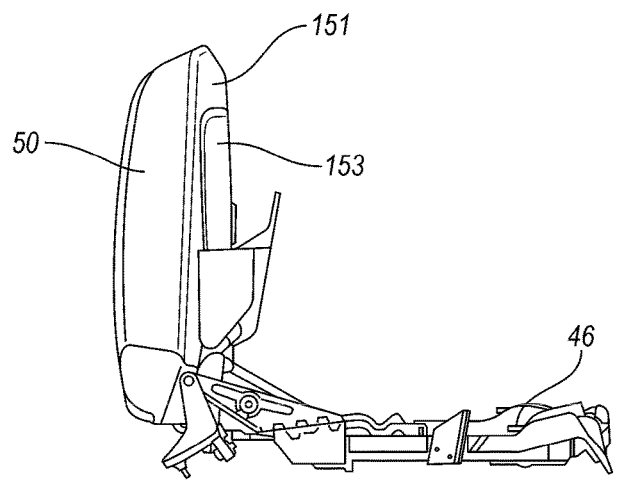
FIG. 12 is a diagrammatical view of another step of the assembly process.
Figure 13:
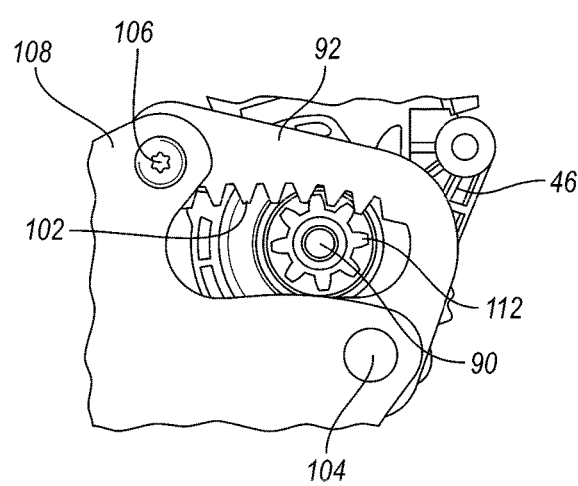
FIG. 13 is a diagrammatical view of yet another step of the assembly process.

FIGS. 11 through 13 describe an example method for trimming the seatbacks 50. The upper subassembly 24 may arrive at a trimming station with the seatbacks 50 connected to their respective bulkheads and with all of the internal components of the upper assembly installed as described above. To prevent the seatbacks 50 from pivoting relative to the bulkheads during transport, the sector gear 92 may be engaged with the pinion 90 and both ends 94, 96 of the sector gear are attached to the frame 64 by the rivet 104 and the removable fastener 106. The clearance between the bulkhead and the seatback may not be enough to install back cushion 151 (which may include a seat foam pad), seat covers 153, and other trim components of the seatback when the sector gear 92 is engaged with the pinion 90. Additional clearance can be gained by disconnecting the sector gear 92 from the pinion 90 and pivoting the seat back away from the bulkhead.

Referring to FIG. 11, as a first step in the trimming process according to one or more embodiments, the removable fastener 106 is removed allowing the sector gear 92 to be pivoted about the rivet 104 to disengage the sector gear 92 from the pinion 90. The seatback 50 may then be pivoted away from the bulkhead at approximately 60 to 120 degrees to allow for trimming of the seatback 50 and the bulkhead 46. In other embodiments, the upper assembly 24 may be transported with the sector gear 92 disengage from the pinion 90 to streamline the assembly process by eliminating the need to perform the step described above.

Referring to FIG. 12, once the seatback 50 is properly positioned relative to the bulkhead 46, the back cushion 151 including the seat pad, and the seat cover 153 may be installed onto the frame 64. Other trim components (not shown) may also be installed at this time. Trim may also be installed on the bulkhead 46 while the sector gear 92 is disconnected from the pinion 90.

Referring to FIG. 13, the seatback 50 may then be rotated relative to the bulkhead 46 to place the sector gear 92 in position to be reconnected with the pinion 90 once trimming is complete. The sector gear 92 is rotated about the rivet 104 to reengage the teeth 102 with the teeth 112. The removable fastener 106 is then reinstalled to secure the sector gear 92 in place.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A rear seat assembly for a vehicle having a vehicle body, the rear seat assembly comprising:
   a bulkhead pivotably mountable to the vehicle body;
   a seat back including a frame having a front side and a backside, and a cushion supported by the frame, wherein the frame is pivotably attached to the bulkhead with the backside facing the bulkhead; and
   a recline mechanism arranged to pivot the seat back relative to the bulkhead.

2. The rear seat assembly of claim 1, wherein the recline mechanism includes a drive arrangement mounted to one of the bulkhead and the seat back and a driven arrangement mounted to the other of the bulkhead and the seat back, wherein the drive arrangement is configured to be driveably engaged with the driven arrangement such that actuation of the drive arrangement pivots the seat back relative to the bulkhead.

3. The rear seat assembly of claim 2, wherein the drive arrangement is mounted to the bulkhead and the driven arrangement is mounted to the seat back.

4. The rear seat assembly of claim 2, wherein the drive arrangement includes a pinion driveably connected to an actuator, and the driven arrangement includes a sector gear configured to be in meshing engagement with the pinion.

5. The rear seat assembly of claim 4, wherein at least one end of the sector gear is attached to the frame with a removable fastener, and another end of the sector gear is pivotably attached to the frame.

6. The rear seat assembly of claim 4, wherein the actuator is an electric motor.

7. The rear seat assembly of claim 1 further comprising a fold-forward mechanism arranged to pivot the bulkhead to a fold-forward position.

8. The rear seat assembly of claim 7 further comprising a bracket configured to connect the bulkhead to the vehicle body and wherein the fold-forward mechanism further includes an actuator and a gearing arrangement configured to pivot the bulkhead relative to the bracket.

9. A vehicle seat assembly for a vehicle having a vehicle body, the vehicle seat assembly comprising:
   a bulkhead mountable to the vehicle body at a first location and including a pair of spaced brackets;
   a seat bottom including a seat pan mountable to the vehicle body at a second location that is different than the first location and including a bottom cushion disposed on the seat pan;
   a seat back including a frame having a pair of spaced apart side members and at least one cross member extending between the side members, wherein a lower end of each of the side members is pivotably attached to a corresponding one of the brackets at a pivot point such that the seat back is pivotable relative to the bulkhead about the pivot point and is supported above the seat bottom by the bulkhead when the vehicle seat assembly is mounted to the vehicle body, and wherein the frame further includes a backside facing the bulkhead and a front side having a back cushion adjacent thereto; and
   a recline mechanism including a driving arrangement mounted to one of the bulkhead and the frame and a driven arrangement mounted to the other of the bulkhead and the frame, wherein the recline mechanism is operable to pivot the seat back relative to the bulkhead.

10. The vehicle seat assembly of claim 9, wherein the pivot points are vertically positioned above a top surface of the bottom cushion when the vehicle seat assembly is mounted to the vehicle body.

11. The vehicle seat assembly of claim 9, wherein the seat bottom and the seat back are not directly connected to each other when the vehicle seat assembly is mounted to the vehicle body.

12. The vehicle seat assembly of claim 9, wherein the drive arrangement includes a pinion driveably connected to an actuator, and the driven arrangement includes a sector gear configured to be in meshing engagement with the pinion.

13. The vehicle seat assembly of claim 12, wherein the sector gear is attached to one of the side members at only two attachment points, wherein one of the attachment points is formed by a removable fastener and the other of the attachments points is operable to permit pivoting of the sector gear relative to the one of the side members when the removable fastener is removed.

14. The vehicle seat assembly of claim 9, wherein the drive arrangement is mounted to the bulkhead and the driven arrangement is mounted to the frame.

15. The vehicle seat assembly of claim 9, wherein the bulkhead is pivotably mountable to the vehicle body at the pivot point.

16. The vehicle seat assembly of claim 15 further comprising a fold-forward mechanism configured to pivot the bulkhead to a fold-forward position, wherein the fold-forward mechanism further includes an actuator arranged to pivot the bulkhead about the pivot points.

17. A method of assembling a vehicle seat including a bulkhead, a back frame, and a recline mechanism having a drive member and a driven member, the method comprising:
attaching the drive member to one of the bulkhead and the back frame;
attaching the driven member to the other of the bulkhead and the back frame;
pivotably attaching the back frame to the bulkhead with a backside of the back frame facing the bulkhead;
with the drive member and the driven member disconnected, installing trim on the back frame while the back frame is in a trim-installation position; and
pivoting the back frame towards the bulkhead and subsequently connecting the driven member to the driver member, wherein the bulkhead is pivotably mountable to a vehicle body, and the recline mechanism is configured to enable the back frame to pivot relative to the bulkhead.

18. The method of claim 17 further comprising:
removing a fastener of the driven member to permit pivoting of the driven member; and
pivoting the driven member to disengage the driven member from the drive member.

19. The method of claim 17, wherein the drive member is connected to the bulkhead and includes a pinion, and the driven member is a sector gear having a first end pivotably connected to the back frame and a second end defining an aperture, and wherein the method further comprises installing a threaded fastener through the aperture and into the back frame to secure the sector gear in meshing engagement with the pinion.

20. The method of claim 17, wherein, in the trim-installation position, an angle between the back frame and the bulkhead is at least 60 degrees.

* * * * *